May 12, 1936.  R. M. GROWER  2,040,481
BITUMINOUS PAVING COMPOSITION AND PROCESS OF MAKING THE SAME
Filed Sept. 4, 1935
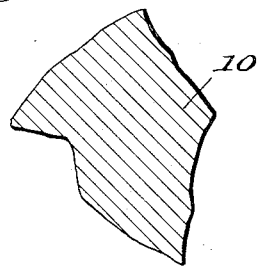
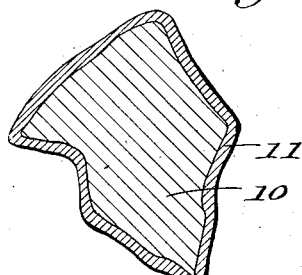
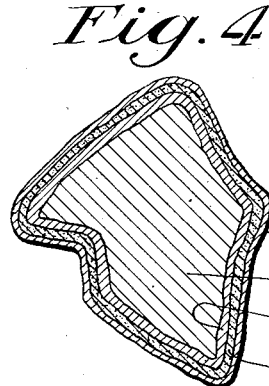
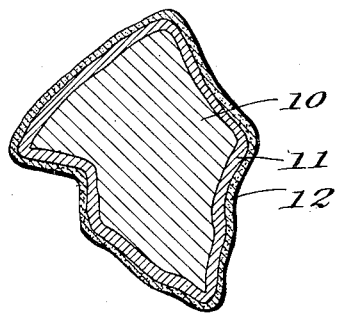
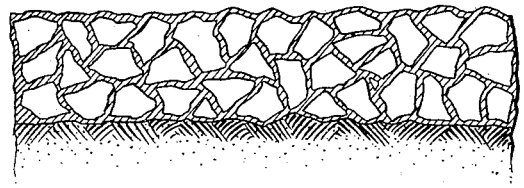
Inventor:
Richard M. Grower
By Dike, Calver + Gray
Attorneys.

Patented May 12, 1936

2,040,481

UNITED STATES PATENT OFFICE 2,040,481

BITUMINOUS PAVING COMPOSITION AND PROCESS OF MAKING THE SAME

Richard M. Grower, Arlington, Mass., assignor to Samuel J. Tomasello, Boston, Mass.

Application September 4, 1935, Serial No. 39,114

3 Claims. (Cl. 106—31)

This invention relates to a bituminous paving composition and the process of making the same.

As is well known in the art, in the manufacture and laying of a bituminous road surface, in which rock and other aggregates are combined with a bituminous cementing material, the rock or other aggregate and bituminous cement are mixed in proper proportions, each in heated condition and are spread and compacted while still hot; or the bituminous cementing material is applied to cold stone or aggregate which has already been laid on the roadway. Such paving composition must be laid and rolled promptly, as on cooling it hardens to a solid mass. Thus, such material must ordinarily be mixed right on the job or close by. The object of my invention is to provide a "cold mix" paving composition which can be prepared in advance at a central plant and can be transported long distances, or piled by the roadside or otherwise stored for several weeks, if necessary, and then be readily handled and used without reheating.

I attain this object by preparing a composition consisting of heated coarse particles of crushed rock or other suitable material mixed with hot bituminous cementing material then chilled or otherwise treated to render the bitumen coating less fluid and sticky, then coated with sand, stone dust, or other suitable material to prevent the coarse coated particles from adhering to each other and forming a solid mass, and finally coating the particles with an asphalt emulsion which will not permit the particles to adhere together and form a solid mass, but still provides a satisfactory cementing material. The process consists in making the material in this manner.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawing:

Fig. 1 represents a particle of coarse aggregate;

Fig. 2 represents the coarse aggregate particle coated with bituminous cementing material;

Fig. 3 represents the coated material further coated with fine aggregate;

Fig. 4 represents the same material as finally coated with asphalt emulsion; and Fig. 5 represents a cross section of roadbed with my composition in place.

In the drawing, 10 represents a particle of coarse aggregate, ordinarily crushed stone, and preferably of a size which will pass through a one-half inch screen. Quantities of such particles preferably heated to a temperature of about 225° F. are then mixed with a bituminous cementing material or asphalt 11, previously heated to a temperature of 250°–300° F. Both are mixed together until the coarse aggregate particles are thoroughly coated with a film or layer of bitumen. The material is then rapidly cooled, as by pouring cold water over it, or otherwise treated to stiffen and harden the bitumen on the coarse aggregate, while being agitated. In this manner the coating on the coarse aggregate particles is hardened and stiffened sufficiently so that it is in a tacky or sticky condition, and not fluid. I have found that superior results in stiffening and toughening the bitumen can be obtained by spraying the mix with an aqueous solution of water soluble salts, such as the salts of sodium, potassium, ammonium or any nitrate, instead of cold water. The coarse aggregate particles are then thoroughly mixed with a fine aggregate 12, such as sand, stone dust or other suitable material. The coarse aggregate particles are thereby coated with the fine aggregate 12, but the bitumen having hardened does not thoroughly coat the fine aggregate 12. The fine aggregate 12 thus serves to prevent the coarse particles 10 from adhering to each other even though the material is mixed in hot weather. Emulsified asphalt 13 or other suitable flux is then incorporated into the mix, and the mix agitated until the coarse aggregate 10 has become thoroughly coated with the emulsion 13. The emulsion 13 is of such consistency that the particles will not adhere together to harden into a solid mass, and can still be easily worked, but under pressure will firmly unite with the bitumen 11.

The composition can then be transported long distances, and can be piled by the roadside or otherwise stored for several weeks, if necessary before being used. When ready for use, the composition is placed and spread in the usual manner and then rolled under considerable pressure, as by a steam roller as shown in Fig. 5. The pressure then causes the bituminous cementing material to form a solid mass with adjacent particles, the fine aggregate coating 12 becoming firmly mixed in the bituminous cement, and acting as a filler, causing thorough adhesion and providing a durable and stable pavement.

I claim:

1. A bituminous paving composition comprising a base of coarse aggregate particles, and coated successively with a layer of bituminous cementing material, a layer of fine aggregate particles, and a surface layer of asphalt emulsion.

2. The process of manufacturing a bituminous paving composition which consists in mixing heated bitumen with a base of coarse aggregate particles, cooling the same and coating them with a layer of fine aggregate particles, and a surface layer of asphalt emulsion which will unite with the bitumen to form a solid mass when subjected to pressure.

3. The process of manufacturing a bituminous paving composition, which consists in mixing heated bituminous cementing material with a base of coarse aggregate particles, treating the mix with an aqueous solution of water soluble salts, coating the coarse aggregate particles with a layer of fine aggregate particles, and adding a surface coating of asphalt emulsion which will unite with the bituminous cementing material when subjected to pressure but which will normally prevent the coarse aggregate particles from solidly adhering to each other.

RICHARD M. GROWER.